United States Patent

Crute et al.

[11] 4,000,828
[45] Jan. 4, 1977

[54] GAS TANK CAP WITH ROLL-OVER VALVING

[75] Inventors: Billy G. Crute; John H. Evans, both of Connersville, Ind.

[73] Assignee: Stant Manufacturing Company, Inc., Connersville, Ind.

[22] Filed: June 2, 1975

[21] Appl. No.: 582,649

[52] U.S. Cl. .............................. 220/203; 220/303; 137/43
[51] Int. Cl.² ........................................ B65D 51/16
[58] Field of Search .......... 220/203, 307, 304, 202; 137/43, 493.6, 512.1, 512.2, 512.3

[56] References Cited

UNITED STATES PATENTS

| 1,682,736 | 9/1928 | Berry | 137/512.3 |
| 1,893,942 | 1/1933 | Jensen | 220/203 |
| 2,396,233 | 3/1946 | Abrams | 220/203 |
| 2,732,971 | 1/1956 | Holmes et al. | 220/203 |
| 3,304,952 | 2/1967 | Krone | 137/512.2 |
| 3,568,695 | 3/1971 | DeFrees | 137/493.6 |
| 3,724,707 | 4/1973 | Burgess | 220/203 |
| 3,757,987 | 9/1973 | Marshall | 220/204 |

FOREIGN PATENTS OR APPLICATIONS

| 544,427 | 9/1922 | France | 137/43 |

Primary Examiner—George E. Lowrance
Assistant Examiner—Allan N. Shoap
Attorney, Agent, or Firm—Jenkins, Hanley & Coffey

[57] ABSTRACT

A cap for closing the filler neck of a vehicle fuel tank, the cap comprising a valve housing, a pressure-vacuum valve assembly disposed in the housing to vent the tank when the pressure in the filler neck drops below a predetermined subatmospheric level and when the pressure in the filler neck exceeds a first predetermined superatmospheric level, a roll-over valve for closing the pressure-vacuum valve assembly when the filler neck is tilted, and an excessive pressure valve for bypassing the pressure-vacuum valve when the pressure in the filler neck exceeds a second and greater predetermined superatmospheric level.

7 Claims, 4 Drawing Figures

GAS TANK CAP WITH ROLL-OVER VALVING

The present invention relates to roll-over gas tank caps, and more particularly to gas tank caps having a roll-over closure valve and an excessive pressure valve which opens to vent the gas tank when an excessive pressure condition is reached in a roll-over situation.

The prior art teaches many different types of roll-over valves for use in combination with the caps which close the filler necks of vehicle fuel tanks. The prior art teaches caps including pressure-vacuum valve means for venting the tank when the pressure drops below a predetermined subatmospheric level and when the pressure exceeds a first predetermined superatmospheric level together with roll-over valve means for closing the pressure-vacuum valve means when the tank is tilted. The present invention constitutes an improvement over the prior art in that it provides an excessive pressure valve means for bypassing the pressure-vacuum valve means when the pressure in the tank exceeds a second and greater predetermined superatmospheric level. Such an excessive pressure could, for instance, rupture the tank and cause even more of a dangerous situation than a limited flow of gasoline through the closure cap.

While the present invention is illustrated and discussed in conjunction with a cap for closing the filler neck of a vehicle fuel tank, it will be appreciated that the valving assembly of the present invention may be used, for instance, in a remote valve assembly not connected to the cap.

An object of the present invention, therefore, is to provide a cap for closing the filler neck of a vehicle fuel tank, the cap comprising a valve housing providing a passageway extending axially therethrough, means for connecting the housing to a filler neck, the housing being formed to provide a first axially outwardly facing valve seat in the passageway, a first valve member, and first spring means for yieldably urging the first valve member axially inwardly against the first valve seat normally to close the passageway. In one embodiment, this first valve member provides a valve opening extending axially therethrough, and pressure-vacuum valve means normally close the valve opening, venting the tank when the pressure in the filler neck drops below a predetermined subatmospheric level and when the pressure in the filler neck exceeds a first predetermined superatmospheric level. The first spring means is calibrated to provide for movement of the first valve member axially outwardly away from the first valve seat when the pressure in the filler neck exceeds a second and greater superatmospheric level. The valve opening provides an axially inwardly facing second valve seat, and a second valve member is disposed in the housing to move axially outwardly into closing engagement with the second valve seat when the filler neck is tilted, for instance, forty-five degrees or more. In other words, in a roll-over situation, the second valve member closes the conventional pressure-vacuum valve means. In such a roll-over situation, with the pressure-vacuum valve means closed, if the pressure in the filler neck exceeds, for instance, 2 psi, the first spring means will yield to permit movement of the first valve member to bleed off such excessive pressure.

Another object of the present invention is to provide such a cap comprising a valve housing formed to provide an axially outer passageway portion, an axially inner passageway portion, and, intermediate said portions and in the center of the passageway, a valve opening which is dominated by the pressure-vacuum valve means which normally vents the tank. The housing is also formed to provide, about the periphery of the valve opening, an annular and axially outwardly facing first valve seat having ports extending therethrough to provide communication between the axially outer passageway portion and the filler neck, the ports bypassing the said valve opening. An annular first valve member is provided together with first spring means for yieldably urging the first valve member axially inwardly against the first valve seat normally to close the ports. This first valve member is the excessive pressure valve in the assembly for bypassing the pressure-vacuum when the said valve opening is closed by a roll-over valve.

Other objects and features of the present invention will become apparent as this description progresses.

Figure 1:
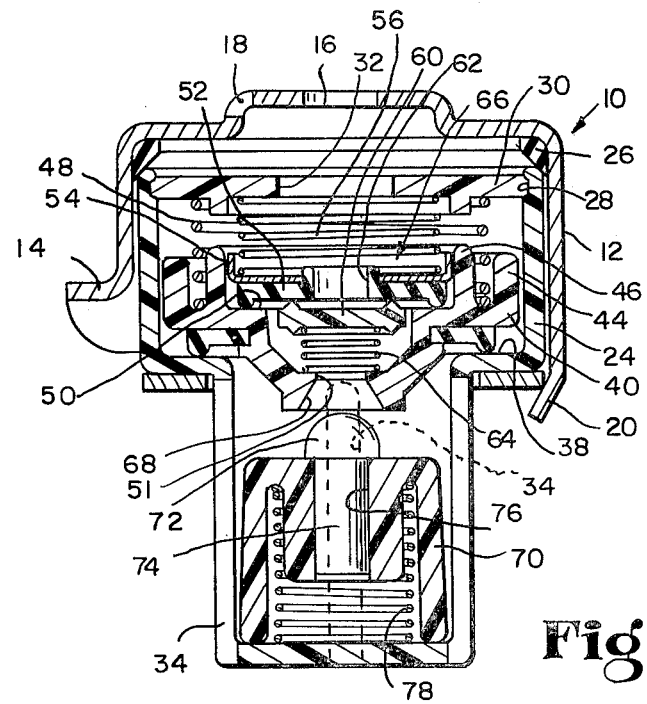
FIG. 1 is a sectional view of one embodiment of the present invention.
Figure 2:
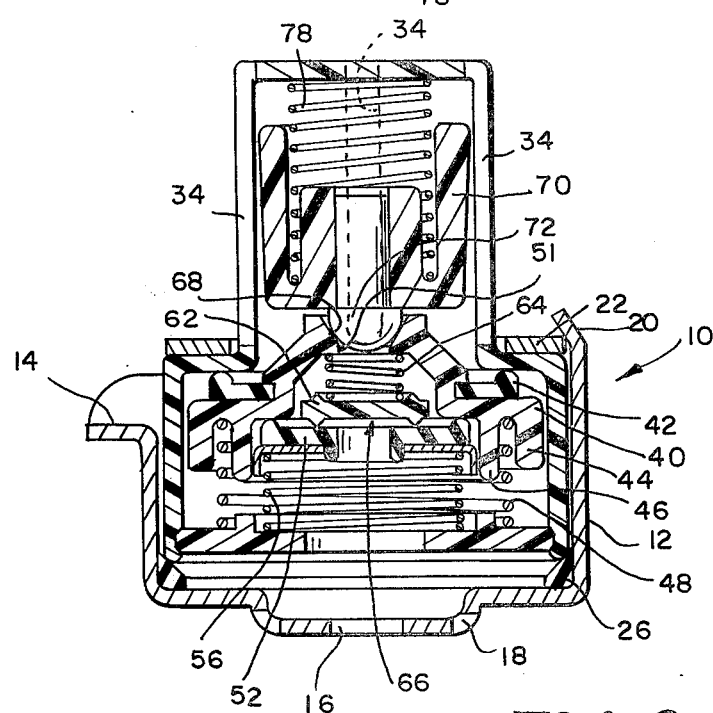
FIG. 2 is an inverted sectional view of the embodiment of FIG. 1 showing the roll-over valve closing the pressure-vacuum valve means.

Referring now to the drawings, and particularly to FIG. 1 and FIG. 2, it will be seen that the cap 10 is shown comprising an outer cup 12 having the usual bayonet fasteners 14 (only one of which is shown) for engaging the cam-lock surface of a filler neck, a rivet hole 16, vent port 18 and bent in tab 20 which captures a retaining ring 22 for a valve housing 24. The valve housing is held upwardly into the cup 12 with its upper peripheral edge against a sealing gasket indicated at 26. The upper end of the valve housing 24 is provided with an internal peripheral groove 28 into which is snapped a retaining plug 30 having a central opening 32 therein. The lower end of the valve housing 24 is provided with a plurality of peripherally spaced apart, axially extending slots 34. Thus, the valve housing 24 provides a valve passageway extending axially therethrough to provide communication between the opening 32 and the slots 34. It will be appreciated that the cup 12 may be riveted to an outer shell or handle (not shown) for the gas cap. Captured between the outer shell and the cup 12 will be the usual sealing gaskets which provide a seal between the cup and the filler neck when the cap is twisted into locking engagement with the filler neck. This type of cap structure is well known and need not be discussed in detail or shown herein. One such structure is shown in the pending application Ser. No. 510,483 filed Sept. 30, 1974 by Billy G. Crute for U.S. Pat. No. 3,938,692 issued Feb. 17, 1976, assigned to the assignee of the present application.

In the embodiment of FIG. 1, the valve housing 24 is formed to provide a radially inwardly extending, axially outwardly facing first valve seat 38. It will be appreciated that this valve seat 38 generally divides the valve housing 24 into an axially outer portion and an axially inner portion. A first valve member 40 is provided for closing the passageway, the valve member 40 carrying a rubberlike sealing gasket 42 which sealingly engages the seat 38. This valve member 40 is provided with an outer peripherally and axially outwardly extending flange 44 and an inner peripherally and axially outwardly extending flange 46 defining a space therebetween which receives a compression spring 48 yieldably urging the first valve member 40 toward the first valve seat 38. This spring 48 is captured between the flanges 44,46 and the plug 30 as shown in the drawing.

The valve member 40 is formed to provide a peripherally and radially inwardly extending and axially outwardly facing pressure valve seat 50 and a central valve opening 51. A pressure valve member 52 is yieldably urged against the seat 50 by means of a spring plate 54 and spring 56. The valve member 52 has a centrally located vacuum valve opening 60 therein, and a vacuum valve 62 is yieldably urged against the valve member 52 by a spring 64 normally to close the opening 60. Therefore, the passageway through the central portion of the first valve member 40 is dominated by a pressure-vacuum valve means indicated generally at 66 which vents the tank when the pressure in the filler neck drops below a predetermined subatmospheric level and when the pressure in the filler neck exceeds a first predetermined superatmospheric level. The first spring 48 is calibrated to provide for movement of the first valve member 40 axially outwardly away from the first valve seat 38 when the pressure in the filler neck exceeds a second and greater superatmospheric level. For instance, the spring 48 may be calibrated to permit excessive pressures greater than 2 psi to be released while the spring 56 may be calibrated to the normal pressure-vacuum pressure relieving in the range of 19–25 inches of water. The spring 64 may provide venting when a vacuum of 4 to 5 inches of water is formed in the tank.

The valve member 40 is also formed to provide an axially inwardly facing valve seat 68, herein referred to as the second valve seat, and the cap 10 comprises a roll-over valve member 70 which, in the illustrative embodiment, includes a spherical head 72 which moves into closing engagment with the seat 68. The head 72 is formed on a pen, the shank 74 of which is received in an opening 76 in the member 70 which may be formed of plastic. The combined weight of the plastic member 70 and pen providing the head 72 may be, for instance, 6.2 grams. This roll-over valve member, herein sometimes referred to as the second valve member, is normally supported by a coiled compression spring 78. The spring 78 is calibrated such that it will normally support the combined weight of the roll-over valve member, giving the valve member a sort of neutral boyancy to assist in the closing of the opening 51 when the vehicle rolls over. It will be appreciated that the roll-over valve is a sort of cup-shaped float valve partially supported by the spring 78 such that the spring actually assists the fluid pressure when a roll-over situation exists.

When the head 72 is in closing engagement with the valve seat 68, i.e., during a roll-over situation, the passageway through the valve housing 24 is closed except for the ability of the first valve member 40 to back away from its seat 38 when an excessive pressure situation exists. Thus, during a roll-over situation, when excessive pressures greater than, for instance, 2 psi, develop in the filler neck and tank, the cap 10 will vent such excessive pressures. FIG. 2 shows the cap 10 inverted 180° with the roll-over valve closing the valve opening through the valve member 40. While FIG. 2 is inverted 180°, it will be appreciated that the roll-over valve member 70 with the spring 78 may be calibrated to close against the seat 68 when the filler neck is tilted more than, for instance, 45°.

Figure 3:
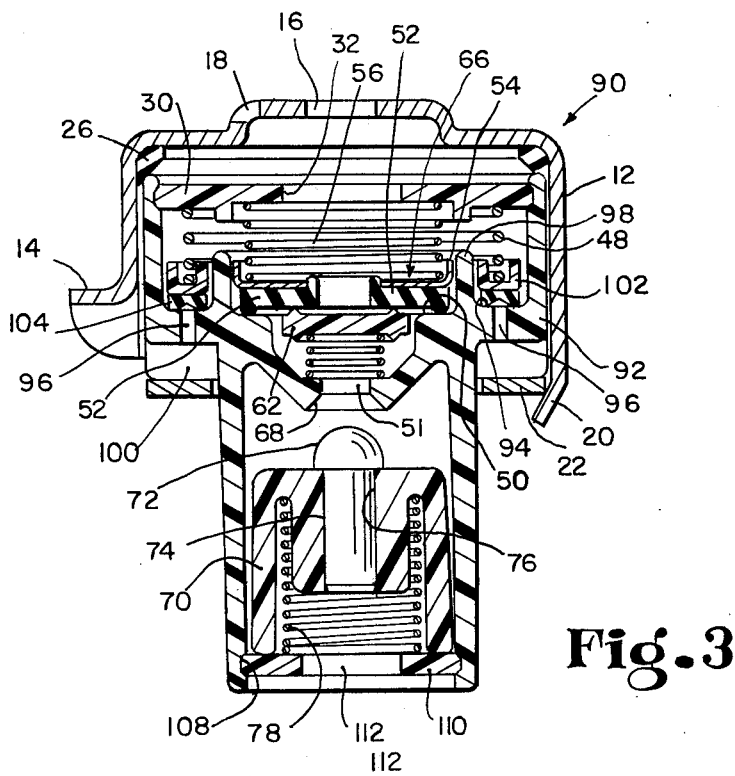
FIG. 3 is a sectional view of another embodiment of the present invention.
Figure 4:
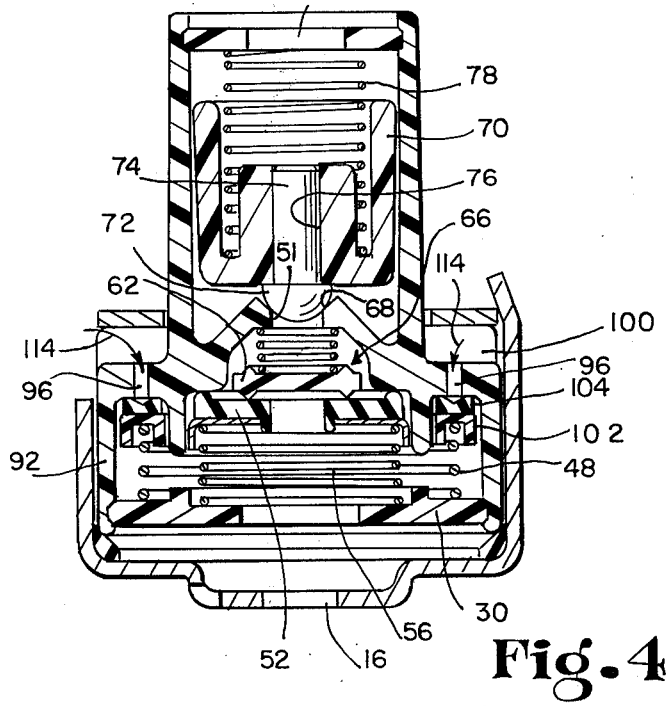
FIG. 4 is a sectional view of the embodiment of FIG. 3 inverted to show the roll-over valve means closing the pressure-vacuum valve means.

Referring now to FIGS. 3 and 4, another embodiment of the present invention will be discussed, like reference numerals representing like parts.

The cap of FIGS. 3 and 4, indicated generally at 90, comprises a valve housing 92 which is somewhat differently shaped than the valve housing 24. It provides a first valve seat 94 which is an annular valve seat extending peripherally about the passageway and facing axially outwardly. This valve seat 94 is formed with ports 96 extending axially therethrough to provide communication between the axially outer portion of the valve housing passageway and the filler neck. The housing 92 is formed to provide a peripherally and axially outwardly extending flange 98 which forms, with the outer peripheral wall of the housing, an annular space in which an excessive pressure valve member 102 is disposed, this valve member being referred to herein as the first valve member. The valve member 102 carries a sealing gasket 104 which sealingly engages the valve seat 94. The excessive pressure spring or first spring 48 yieldably urges the valve member 102 toward the seat 94 normally to close the ports 96. The housing 92 is also provided with a plurality of peripherally spaced apart, axially inwardly extending spacers 100 against which the retaining ring 22 is held by the tab 20.

The pressure-vacuum valve means 66, therefore, dominates a valve opening provided by the valve housing 92 itself instead of by the excessive pressure valve member as in the embodiments of FIGS. 1 and 2. In other words, the pressure valve seat 50 and the roll-over valve seat 68 are seats rigidly provided by the valve housing 92. Because of the seat 50 and the portion of the housing 92 providing the valve seat 68, the roll-over valve member 70 must be assembled from the axially inner end of the valve housing. Thus, the housing 92 is provided with an internal peripherally extending groove 108 into which a plug 110 is snapped, the lug providing a venting passageway 112. The lower tubular end of the housing 92 may be provided with a plurality of peripherally spaced apart, axially extending slots (not shown) such as the slots 34 shown in FIGS. 1 and 2 or any other such ports to provide communication to the tank through the housing 92. FIG. 4 shows the embodiment of FIG. 3 inverted 180° to show the roll-over valve member 70 closing the normal pressure-vacuum valve means. When such a roll-over situation occurs, the only venting that can occur through the cap 10 occurs through the ports 96 which bypass the normal pressure-vacuum valve means 66. The ports 96, of course, are normally closed by the excessive pressure valve member 102 with its gasket 104.

We claim:

1. A cap for closing the filler neck of a vehicle fuel tank, said cap comprising a valve housing providing a passageway extending axially therethrough, means for connecting said housing to a filler neck, said housing being formed to provide a first axially outwardly facing valve seat in said passageway, a first valve member, first spring means for yieldably urging said first valve member axially inwardly against said first valve seat normally to close said passageway, said first valve member providing a valve opening extending axially therethrough, pressure-vacuum valve means normally closing said valve opening and venting the tank when the pressure in the filler neck drops below a predetermined subatmospheric level and when the pressure in the filler neck exceeds a first predetermined superatmospheric level, said first spring means being calibrated to provide for movement of said first valve member axially outwardly away from said first valve seat when the pressure in the filler neck exceeds a second and greater superatmospheric level, said valve opening providing an axially inwardly facing second valve seat, a second valve member disposed in said housing to move axially outwardly into closing engagement with said second valve seat when said filler neck is tilted, and second spring means disposed to urge said second valve member axially toward said second valve seat, said second spring means having a calibration normally to support said second valve member out of engagement with said second valve seat when said filler neck is in an upright orientation and to assist in moving said second valve member into engagement with said second valve seat when said filler neck is tilted.

2. A cap for closing the filler neck of a vehicle fuel tank, said cap comprising a valve housing providing a passageway extending axially therethrough, means for connecting said housing to a filler neck, said housing being formed to provide a first axially outwardly facing valve seat in said passageway, a first valve member, first spring means for yieldably urging said first valve member axially inwardly against said first valve seat normally to close said passageway, said first valve member providing a valve opening extending axially therethrough, pressure-vacuum valve means normally closing said valve opening and venting the tank when the pressure in the filler neck drops below a predetermined subatmospheric level and when the pressure in the filler neck exceeds a first predetermined superatmospheric level, said first spring means being calibrated to provide for movement of said first valve member axially outwardly away from said first valve seat when the pressure in the filler neck exceeds a second and greater superatmospheric level, said valve opening providing an axially inwardly facing second valve seat, a second valve member disposed in said housing to move axially outwardly into closing engagment with said second valve seat when said filler neck is tilted, said second valve member including an inverted plastic cup having a central opening extending axially therein and a metal pin received in said opening, said metal pin having a head formed to engage and close said second valve seat, and second spring means disposed to urge said second valve member axially toward said second valve seat, said second spring means being calibrated to urge said cup and pin toward said second valve seat.

3. A cap for closing the filler neck of a vehicle fuel tank, said cap comprising a valve housing providing a passageway extending axially therethrough, means for connecting said housing to a filler neck, said housing being formed to provide an axially outer passageway portion, an axially inner passageway portion, and, intermediate said portions and in the center of said passageway, a valve opening, said housing also providing, about the periphery of said valve opening, an annular and axially outwardly facing first valve seat, said first valve seat having ports extending therethrough to provide communication between the axially outer passageway portion and the filler neck, said ports bypassing said valve opening, an annular first valve member, first spring means for yieldably urging said first valve member axially inwardly against said first valve seat normally to close said ports, pressure-vacuum valve means normally closing said valve opening and venting the tank when the pressure in the filler neck drops below a predetermined subatmospheric level and when the pressure in the filler neck exceeds a first predetermined superatmospheric level, said first spring means being calibrated to provide for movement of said first valve member axially outwardly away from said first valve seat when the pressure in the filler neck exceeds a second and greater superatmospheric level, said valve opening providing an axially inwardly facing second valve seat, and a second valve member disposed in said passageway to move axially outwardly into closing engagement with said second valve seat when said filler neck is tilted.

4. The invention of claim 3 including second spring means disposed to urge, said second valve member axially outwardly toward said second valve seat.

5. The invention of claim 3 in which said second valve member includes an inverted plastic cup having a central opening extending axially therein, and a metal pin received in said opening, said metal pin having a head formed to engage and close said second valve seat.

6. The invention of claim 5 including second spring means disposed to urge said second valve member axially toward said second valve seat, said second spring means being calibrated to urge said cup and pin toward said second valve seat.

7. The invention of claim 3 including second spring means disposed to urge said second valve member axially toward said second valve seat, said second spring means having a calibration to support said second valve member.

* * * * *